United States Patent [19]

Dziurla et al.

[11] Patent Number: 4,985,175
[45] Date of Patent: Jan. 15, 1991

[54] ELASTOMER-MODIFIED CARBON-CONTAINING POLYARYLENE SULFIDE BLENDS

[75] Inventors: Hans-Jürgen Dziurla, Leverkusen; Klaus Reinking, Wermelskirchen; Wolfgang Wehnert; Erhard Tresper, both of Krefeld, all of Fed. Rep. of Germany

[73] Assignee: Bayer Aktiengesellschaft, Leverkusen, Fed. Rep. of Germany

[21] Appl. No.: 393,217

[22] Filed: Aug. 14, 1989

[30] Foreign Application Priority Data

Aug. 24, 1988 [DE] Fed. Rep. of Germany ....... 3828696

[51] Int. Cl.$^5$ .............................................. C08K 3/04
[52] U.S. Cl. ..................................... 252/506; 252/507; 252/508; 252/511; 525/64; 525/68; 524/504
[58] Field of Search ............... 252/506, 507, 508, 511; 525/64, 68

[56] References Cited

U.S. PATENT DOCUMENTS

| 4,436,865 | 3/1984 | Beever | 525/64 |
| 4,581,158 | 4/1986 | Lin | 524/439 |
| 4,748,169 | 5/1988 | Izotsu et al. | 515/64 |
| 4,772,422 | 9/1988 | Hijikata et al. | 524/495 |

Primary Examiner—Bernard Lipman
Attorney, Agent, or Firm—Connolly and Hutz

[57] ABSTRACT

The invention relates to conductive blends of polyarylene sulfides (PAS), preferably polyphenylene sulfide (PPS), with graft polymers, conductive carbon black and graphite.

10 Claims, No Drawings

ELASTOMER-MODIFIED CARBON-CONTAINING POLYARYLENE SULFIDE BLENDS

This invention relates to conductive blends of polyarylene sulfides (PAS), preferably polyphenylene sulfide (PPS), with graft polymers, conductive carbon black and graphite.

Polyarylene sulfides and their production are known (cf. for example U.S. Pat. No. 3,354,129, EP-OS 171 021).

It is also known that polyarylene sulfides can be blended with fillers, for example conductive carbon black (cf. for example U.S. Pat. No. 354,129, JP-OS 161 960). These blends of polyarylene sulfides with conductive carbon black are distinguished by low electrical resistances. For example, a volume resistivity of 300 ohms·cm was measured on injection-molded plates of polyarylene sulfide containing 30% by weight conductive carbon black (JP-OS 161,960).

Although in principle the electrical resistance values can be further reduced by increasing the concentration of carbon black, this is difficult to do in practice.

The electrical resistances obtainable solely with conductive carbon black are too high for many technical applications including, for example, low-voltage heating elements (up to 42 V).

Another disadvantage of blends of the type in question is that mold release aids have to be added to them for the production of injection-molded articles.

However, the addition of mold release aids can adversely affect mechanical properties including, for example, tensile and flexural strength, toughness and outer fiber strain.

It has now been found that mixtures of polyarylene sulfides, preferably polyphenylene sulfide, with 1–60% by weight, preferably 5–60% by weight, and most preferably 10–20% by weight of a graft polymer, preferably an acrylate graft polymer, display considerably lower electrical resistance values than comparable mixtures not containing these graft polymers.

These graft polymers, preferably acrylate graft polymers, improve the flowability and thus promote the dispersion of the added carbon (carbon black/graphite).

The invention relates to blends of
(a) 20–82% by weight of polyarylene sulfide, preferably polyphenylene sulfide,
(b) 4–60% by weight of conductive carbon black,
(c) 4–60% by weight of graphite and
(d) 1–60%, preferably 5 to 60%, and most preferably 10 to 20% by weight, of a graft polymer of
  (A) 25 to 95 parts by weight of a copolymer of
    (a) 75 to 99.8 parts by weight of a $C_1$–$C_6$-alkyl acrylate,
    (b) 0.1 to 5 parts by weight of a monomer containing at least 2 non-conjugated olefinic double bonds and
    (c) 0 to 40 parts by weight of other monomers and
  (B) 75 to 5 parts by weight of a resin which has been obtained by polymerisation of at least one olefinically unsaturated monomer and has been produced in the presence of (A), the sum of the percentages by weight of constituents (a)+(b)+(c)+(d) being in each case 100% by weight.

The low concentration of carbon black and graphite in the mixture has considerable advantages, for example in the production of the blends. The mixtures have good mechanical properties.

Carbon blacks suitable for the purposes of the invention are, for example, gas blacks, furnace blacks, lamp blacks. They have average primary particle diameters in the range from 5 to 200 nanometers (nm), preferably in the range from 10 to 100 nm and more preferably in the range from 15 to 50 nm.

The BET surfaces of the carbon blacks suitable for use in accordance with the invention are greater than 20 $m^2/g$. Their dibutyl phthalate (DBP) adsorption is greater than 40 ml/100 g carbon black.

Carbon blacks suitable for the purposes of the invention are, for example, commercially available conductive carbon blacks such as, for example, Cabot Black Pearl 2000 ®, Cabot Vulcan XC 72 ® and 72 R ®, Cabot Vulcan P ®, Phillips XE 2 ®, Ketjen Black EC 600 ®, finely powdered coke, etc.

Graphites suitable for use in accordance with the invention are graphite powders, graphite fibers or graphite dusts of the type commercially available in a wide particle diameter spectrum of up to 5 mm, for example as electrode graphite. Preferred graphic powders have average particle diameters of up to 1 mm and preferably of up to 0.5 mm.

The graft polymers are obtained by polymerisation of olefinically unsaturated monomers in the presence of prepolymer (A), a considerable proportion of the monomers being grafted on to prepolymer (A). The production of such graft polymers is in principle known (e.g. R.J. Ceresa, Block and Graft Copolymers, Butterworth, London 1962).

According to the invention graft polymers are preferred which have elastomeric properties and whose glass transition temperature is lower than +10° C., and is in particular from −150° to −20° C. and preferably from −80° to −30° C. The glass transition temperature can be determined according to B. Vollmert, Grundriβ der Makromolekularen Chemie, Pages 406–410, Springer-Verlag, Heidelberg, 1962.

The preferred $C_1$–$C_6$-alkyl acrylate (a) is n-butyl acrylate.

Particularly preferred graft polymers can be produced by customary multi-stage emulsion polymerisation processes, from n-butyl acrylate, 1,3-butylene diacrylate and diallyl maleate in the firsst stage and methyl methacrylate in the second stage, the preferred monomer ratio (based on weight) being approximately 79.2/0.4/20.0.

Preferred monomers (b) containing at least two non-conjugated double bonds per molecule are polyacrylic and polymethacrylic acid esters of polyhydric alcohols, in particular those containing 2 to 8 C atoms and 2 to 4 hydroxyl groups, such as for example butylene diacrylate and butyl dimethylacrylate, trimethylolpropane trimethacrylate; di- and trivinylbenzene, vinyl acrylate and vinyl methacrylate; alkyl esters of unsaturated mono and dicarboxylic acids, such as, for example, alkyl acrylate and alkyl methacrylate, dialkyl maleate, fumarate and itaconate, and monoalkyl maleate, fumarate and itaconate; and dialkyl esters of polycarboxylic acids which do not contain any polymerisable double bonds.

Particularly preferred monomers (b) are butylene diacrylate, allyl methacrylate and diallyl maleate.

Preferred monomers (c) are ethylene, isoprene, vinyl ethers, butadiene, styrene, vinyl esters, vinyl halides, vinyl-substituted heterocyclic compounds such as vinyl pyrrolidone, acrylonitrile and mixtures of these monomers.

Preferred olefinically unsaturated monomers for the production of component (B) are $C_1$-$C_4$-alkyl acrylates and methacrylates, styrene and acrylonitrile. These monomers used for the production of component (B) preferably contain at least 50% by weight of $C_1$-$C_4$-alkyl methacrylate.

It is advantageous for the graft polymers to have a considerable content of polar groups. Products are appropriately selected which consist of more than 10% by weight of (meth)acrylic acid esters and (meth)-acrylonitrile. If the content of (meth)acrylic esters is more than 70% by weight, (meth)acrylonitrile is appropriately dispensed with as a component.

Preferred graft polymers are those consisting of
60-95% by weight of a graft base and
40-5% by weight of a graft superstrate, the graft base being obtainable from a monomer mixture containing
95-99.8% by weight of butyl acrylate,
0.4-2.5% by weight of butylene diacrylate and
0.1-2.6% by weight of allyl methacrylate or diallyl maleate and the graft superstrate being obtainable from
60-100% by weight of methyl methacrylate and
40-0% by weight of other monomers.

The preferred graft polymers have an average particle diameter $d_{50}$ (measured by means of an ultracentrifuge according to W. Sholtan, H. Lange, Kolloid, Z. n. Z. Polymere 250, 782-796 (1972)) of 0.2 to 0.6, preferably 0.3 to 0.5 μm.

The prepolymers and the graft polymers are produced in a customary manner, preferably by emulsion polymerisation with customary radical initiators, emulsifiers and regulators in an aqueous emulsion or dispersion. The production of suitable graft polymers is for example described in DE-PS 1,260,135 and 1,238,207.

The blends according to the invention may optionally contain other standard fillers and reinforcing materials, for example aramide fibers, carbon fibers, glass fibers, or other inorganic additives, such as talcum, quartz, mica, chalk, pigments, etc., which may optionally be pretreated in the usual way. They may be added in quantities of up to 200% by weight, based on the total weight of components (a) +(b) +(c) +(d).

Another advantage of the blends according to the invention is that none of the usual, for example wax-like, mold release aids, have to be added for the production of injection-molded articles from the blends.

Moldings produced from the blends according to the invention are distinguished by distinctly better mechanical properties, including for example toughness, outer fiber strain, flexural strength, elasticity, etc.

The blends according to the invention of polyarylene sulfides, conductive carbon black, graphite and thermoplastic rubber and, optionally, other fillers and reinforcing materials may be produced by known compounding techniques, for example in single-screw or multiple-screw extruders, for example ZSK machines or suitable kneaders for example Buss co-kneaders, preferably in machines with a degassing facility, or by suitable agglomeration processes, for example in Palkmann and/or Condux agglomerators.

The blends according to the invention may also be produced in the form of powder blends.

Powder blends may be produced, for example, in cone-screw mixers, tumble mixers, turbine mixers, Rhönrad mixers or similar mixers.

The blends according to the invention may be processed to moldings, semi-finished goods, films or fibers.

Depending on the electrical resistances adjusted and the type of fillers and reinforcing materials used, for example metal fibers, flakes or powders and/or combinations thereof, moldings of the blends according to the invention may be used as electrical resistance heating elements, as conductors of electrical charges (for example as protection against electrostatic effects) or for shielding against eletromagnetic waves.

| Examples | |
|---|---|
| 1. Comparison: compound without thermoplastic rubber | |
| Polyphenylene sulfide produced in accordance with EP-OS 171 021 | 40.0% by weight |
| Conductive carbon black (Cabot Vulcan XC 72 ®) | 20.0% by weight |
| Graphite (Merck) | 10.0% by weight |
| Mica | 30.0% by weight |
| Surface resistivity (DIN 53 596) VDE 0303, Part 3, potential method) | $p_S = 49.0$ Ohms |
| Volume resistivity (DIN 53 596, VDE 0303, Part 3, potential method) | $p_D = 2.1$ Ohms · cm |
| 2. Polyphenylene sulfide produced in accordance with EP-OS 171 021 | 0% by weight |
| Conductive carbon black (Cabot Vulcan CX 72 ®) | 10.0% by weight |
| Graphite (Merck) | 5.0% by weight |
| Glass fibers | 20.0% by weight |
| Acrylate rubber (Paraloid KM 330) | 13.0% by weight |
| Surface resistivity (DIN 53 56, VDE 0303, Part 3, potential method) | $p_S = 65$ Ohms |
| Volume resistivity (DIN 53 596), VDE 0303, Part 3, potential method) | $p_D = 3.7$ Ohms · cm |
| 3. Polyphenylene sulfide produced in accordance with EP-OS 171 021 | 64.0% by weight |
| Conductive carbon black (Cabot Vulcan XC 72 ®) | 10.0% by weight |
| Graphite (Merck) | 5.0% by weight |
| Mica | 5.0% by weight |
| Acrylate rubber (Paraloid KM 330 ®) | 16.0% by weight |
| Surface resistivity (DIN 53 596, VDE 0303, Part 3, potential method) | $p_S = 92$ Ohms |
| Volume resistivity (DIN 53 596) | $p_D = 37$ Ohms · cm |

| Mechanical Characteristics | | | |
|---|---|---|---|
| | Standard Example | | |
| Test method | 1 | 2 | 3 |
| Flexural strength, N/nm² | 95 | 145 | 93 |
| Outer fiber strain at % maximum force | 0.76 | 1.9 | 2.9 |
| Impact strength KJ/m² | 14 | 24.6 | 19 |

We claim:
1. Conductive blends of
   (a) 20 to 82% by weight of polyarylene sulfide,
   (b) 4 to 60% by weight of conductive carbon black,
   (c) 4 to 60% by weight of graphite,
   (d) 1 to 60% by weight of a graft polymer of
      (A) 25 to 95 parts by weight of a copolymer of
         (a) 75 to 99.8 parts by weight of a $C_1$-$C_6$-alkyl acrylate,

(b) 0.1 to 5 parts by weight of a monomer containing at least 2 non-conjugated olefinic double bonds and (c) 0 to 40 parts by weight of an unsaturated monomer other than (a) and (b) and (B) 75 to 5 parts by weight of a resin which has been obtained by polymerisation of at least one olefinically unsaturated monomer and has been produced in the presence of (A), the sum of the percentages by weight of constituents (a)+(b)+(c)+(d) being in each case 100% by weight, and optionally other standard fillers and reinforcing materials.

2. Mixtures as claimed in claim 1, characterized in that the polyarylene sulfide is polyphenylene sulfide.

3. Mixtures as claimed in claim 1, characterized in that the graft polymer is an acrylate rubber.

4. Mixtures as claimed in claim 1, characterized in that they contain metal fibers, flakes or powders as filler.

5. Molded articles, fibers and films comprising the mixtures claimed in claim 1.

6. Mixtures as claimed in claim 1 wherein component (B) is obtained by the polymerization of $C_1$-$C_4$ alkyl acrylates or methacrylates, styrene, acrylonitrile or mixtures thereof.

7. Mixtures as claimed in claim 1 wherein componet (B) is a $C_1$-$C_4$ alkyl methacrylate.

8. Mixtures as claimed in claim 1 wherein monomer (b) is a polyacrylic or polymethacrylic acid ester of a polyhydirc alcohol containing 2 to 8 carbon atoms and 2 to 4 hydroxyl groups.

9. Mixtures as claimed in claim 1 wherein monomer (b) is butylene diacrylate, allyl methacrylate or diallyl maleate.

10. Mixtures as claimed in claim 1 wherein monomer (c) is ethylene, isoprene, a vinyl ether, butadiene, styrene, a vinyl ester, a vinyl halide, a vinyl-substituted heterocyclic compound or a mixture thereof.

* * * * *